US012679124B2

(12) United States Patent
Horiuchi

(10) Patent No.: US 12,679,124 B2
(45) Date of Patent: Jul. 14, 2026

(54) PRINTING APPARATUS AND CONTROL METHOD

(71) Applicant: CANON KABUSHIKI KAISHA, Tokyo (JP)

(72) Inventor: Akinori Horiuchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 419 days.

(21) Appl. No.: 18/111,966

(22) Filed: Feb. 21, 2023

(65) Prior Publication Data

US 2023/0271438 A1 Aug. 31, 2023

(30) Foreign Application Priority Data

Feb. 25, 2022 (JP) ................................ 2022-028237
Dec. 28, 2022 (JP) ................................ 2022-211293

(51) Int. Cl.
*B41J 29/393* (2006.01)
*B41J 3/46* (2006.01)
*B41J 11/00* (2006.01)

(52) U.S. Cl.
CPC ............... *B41J 29/393* (2013.01); *B41J 3/46* (2013.01); *B41J 11/008* (2013.01); *B41J 2029/3935* (2013.01)

(58) Field of Classification Search
CPC . B41J 29/393; B41J 3/46; B41J 11/008; B41J 2029/3935; B41J 3/60; B41J 13/106; B41J 2203/01; B41J 29/38
See application file for complete search history.

(56) References Cited

U.S. PATENT DOCUMENTS 7,379,678 B2 5/2008 Motoyama et al.
7,580,646 B2 8/2009 Motoyama et al.
(Continued)

FOREIGN PATENT DOCUMENTS

CN 1873549 A 12/2006
CN 205992942 U 3/2017
(Continued)

OTHER PUBLICATIONS

Chinese Office Action dated Oct. 15, 2025, in related Chinese Patent Application No. 202310156905.7 (with English translation).
(Continued)

*Primary Examiner* — Jannelle M Lebron
(74) *Attorney, Agent, or Firm* — VENABLE LLP

(57) ABSTRACT

A printing apparatus includes a printing unit which performs printing on a printing medium with a printing material, a first printing control unit which controls the printing unit to print, on a first side of the printing medium, an adjustment process pattern for an adjustment process for adjusting a position in which the printing material is printed, and a second printing control unit which controls the printing unit to print the adjustment process pattern on a second side, which is a back side of the first side, after printing of the adjustment process pattern on the first side is completed. A notification unit executes a notification process for notifying information on execution of the adjustment process and identification information for suppressing a user from removing the printing medium with the adjustment process pattern printed on the first side.

22 Claims, 10 Drawing Sheets

(56) References Cited

U.S. PATENT DOCUMENTS

| | | | |
|---|---|---|---|
| 10,926,563 B2 | 2/2021 | Hirai et al. | |
| 2016/0034228 A1 | 2/2016 | Kaneka | |
| 2020/0039248 A1* | 2/2020 | Suzuki | B41J 11/46 |

FOREIGN PATENT DOCUMENTS

| | | | |
|---|---|---|---|
| JP | H05-328001 A | | 12/1993 |
| JP | H10-157212 A | | 6/1998 |
| JP | 2006-103283 A | | 4/2006 |
| JP | 2007334077 A | * | 12/2007 |
| JP | 2010-126264 A | | 6/2010 |
| JP | 2012-168962 A | | 9/2012 |
| JP | 2019-124812 A | | 7/2019 |
| JP | 2020-019241 A | | 2/2020 |

OTHER PUBLICATIONS

Chinese Office Action dated Mar. 13, 2026, in related Chinese Patent Application No. 202310156905.7 (with English translation).

* cited by examiner

PRINTING APPARATUS AND CONTROL METHOD

BACKGROUND

Field

The present disclosure relates to a printing apparatus capable of printing on both sides of a printing medium with a printing material such as ink or toner in a noncontact manner and a method of controlling the printing apparatus.

Description of the Related Art

There is an adjustment process for improving the accuracy of a position in which a printing material is printed. For example, in a printing apparatus which ejects ink from a print head and performs printing, in order to improve print quality, a registration adjustment is performed for each kind of ink ejectable from the print head to increase the landing accuracy of each ink on a printing medium. Incidentally, the registration adjustment is a process of reading and analyzing a test pattern printed on a printing medium by the print head to improve the control of a position in which a printing material is printed. The registration adjustment for improvement in landing accuracy of ink is referred to herein as "head adjustment" as appropriate. In a printing apparatus capable of printing on both sides of a printing medium, a predetermined pattern is printed on both sides to perform the head adjustment.

Japanese Patent Laid-Open No. 2020-019241 discloses a technique wherein on the occurrence of an error caused by inappropriate execution of a head adjustment at the time of initial setup, the head adjustment is performed again in a different method according to the content of the error.

However, the technique disclosed in Japanese Patent Laid-Open No. 2020-019241 relates to a technique after the occurrence of an error. The head adjustment must be performed again on the occurrence of an error, which increases the amount of consumption of consumables such as ink and printing medium.

SUMMARY

In the first aspect of the present invention, there is provided a printing apparatus including:

- a printing unit configured to perform printing on a printing medium with a printing material;
- a first printing control unit configured to control the printing unit to print, on a first side of the printing medium, an adjustment process pattern for an adjustment process for adjusting a position in which the printing material is printed;
- a second printing control unit configured to control the printing unit to print the adjustment process pattern on a second side, which is a back side of the first side, after printing of the adjustment process pattern on the first side is completed; and
- a notification unit configured to execute a notification process for notifying information on execution of the adjustment process and identification information for suppressing a user from removing the printing medium with the adjustment process pattern printed on the first side.

In the second aspect of the present invention, there is provided a printing apparatus including:

- a printing unit configured to perform printing on a printing medium with a printing material;
- a first printing control unit configured to control the printing unit to print, on a first side of the printing medium, an adjustment process pattern for an adjustment process for adjusting a position in which the printing material is printed;
- a second printing control unit configured to control the printing unit to print the adjustment process pattern on a second side, which is a back side of the first side, after printing of the adjustment process pattern on the first side is completed; and
- a notification unit configured to execute a notification process for notifying identification information for suppressing a user from removing the printing medium with the adjustment process pattern printed on the first side,
- wherein the notification process is not executed in a case where an instruction to execute double-sided printing for performing printing on the first side and the second side of the printing medium based on print data is accepted, and
- the notification process is executed in a case where execution of the adjustment process is accepted.

In the third aspect of the present invention, there is provided a method of controlling a printing apparatus performing printing on a printing medium with a printing material, the method including:

- a first printing step of printing, on a first side of the printing medium, an adjustment process pattern for an adjustment process for adjusting a position in which the printing material is printed;
- a second printing step of printing the adjustment process pattern on a second side, which is a back side of the first side, after printing of the adjustment process pattern on the first side is completed; and
- a notification step of executing a notification process for notifying information on execution of the adjustment process and identification information for suppressing a user from removing the printing medium with the adjustment process pattern printed on the first side.

According to the present disclosure, the occurrence of an error in the head adjustment can be prohibited (or suppressed).

Further features of the present disclosure will become apparent from the following description of exemplary embodiments with reference to the attached drawings.

DESCRIPTION OF THE EMBODIMENTS

An example of embodiments of the printing apparatus and control method will be hereinafter described in detail with reference to the accompanying drawings. It should be noted that the following embodiments do not limit the present disclosure and not all combinations of features explained in the embodiments are necessarily essential for means for solving of the present disclosure. It should also be noted that positions, shapes, and the like of constituent elements described in the embodiments are merely shown as examples and do not intend to restrict the scope of the disclosure to these examples.

First Embodiment

First, a printing apparatus according to a first embodiment will be described with reference to FIG. 1 to FIG. 7. The printing apparatus according to the present embodiment is a printing apparatus capable of printing on both sides of a printing medium with a printing material and adjusting a printing position of the printing material on the printing medium by printing and analyzing an adjustment pattern (or test pattern). For example, the printing apparatus according to the present embodiment is an inkjet printing apparatus capable of ejecting ink to and performing printing on both sides of a printing medium and adjusting a landing position of ink on a printing medium for each type of ink by printing and analyzing an adjustment pattern (described later). Incidentally, the adjustment process for improving the accuracy of a position of printing of a printing material by reading a test pattern printed on a printing medium by the print head is referred to herein as "head adjustment," "registration adjustment," or "head displacement correction process" as appropriate. In a printing apparatus capable of printing on both sides of a printing medium, a predetermined pattern is printed on both the sides to perform the head adjustment. Incidentally, every kind of head displacement is caused by a manufacturing error of a head chip or nozzle of the print head, a head chip arrangement error, or the like. There are an inter-array displacement between nozzle arrays in a head chip, an inter-chip displacement between head chips, an inter-color displacement between print heads, and the like. If such a displacement occurs, for example, in an inkjet printing system, a landing position of an ink droplet is displaced from an ideal position, which decreases the quality of a printed image. The head adjustment is a function of correcting a landing position of ink by changing an ink ejection timing or an ejection nozzle of the head chip.

Apparatus Configuration

Figure 1:
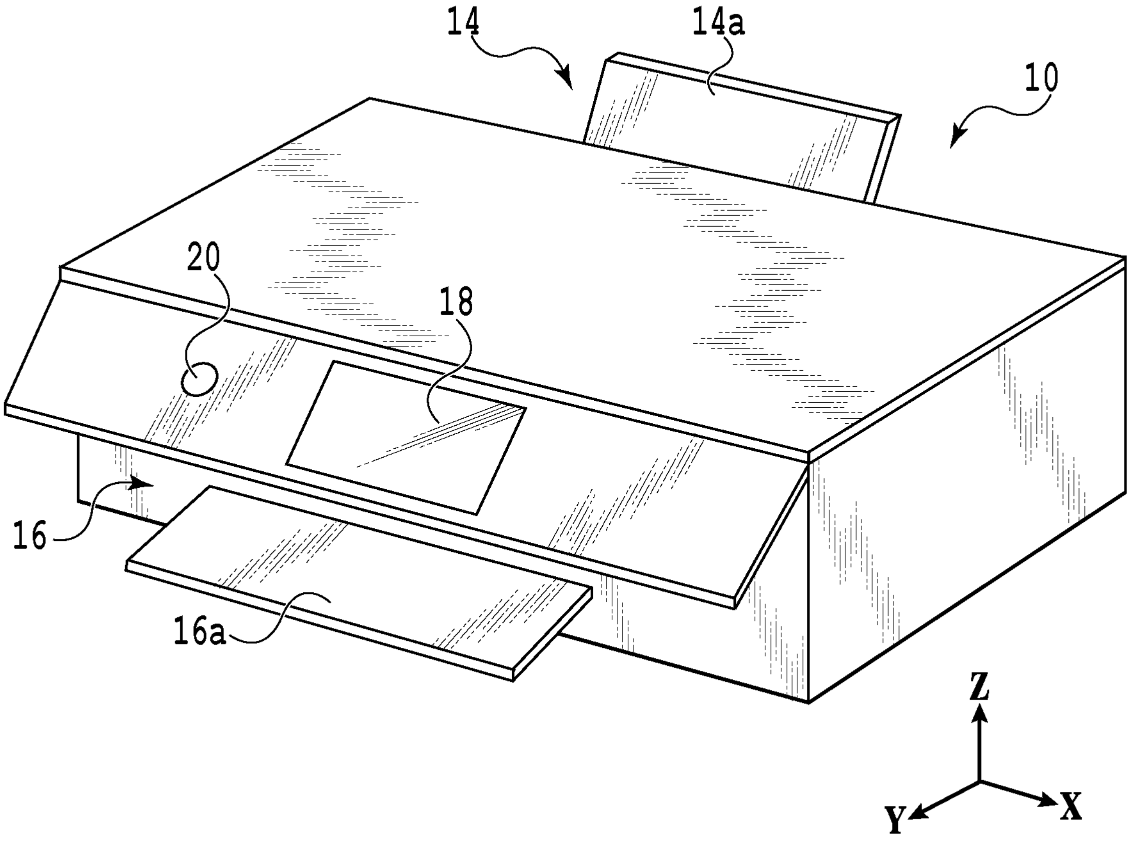
FIG. 1 is a schematic configuration diagram of a printing apparatus.
Figure 2:
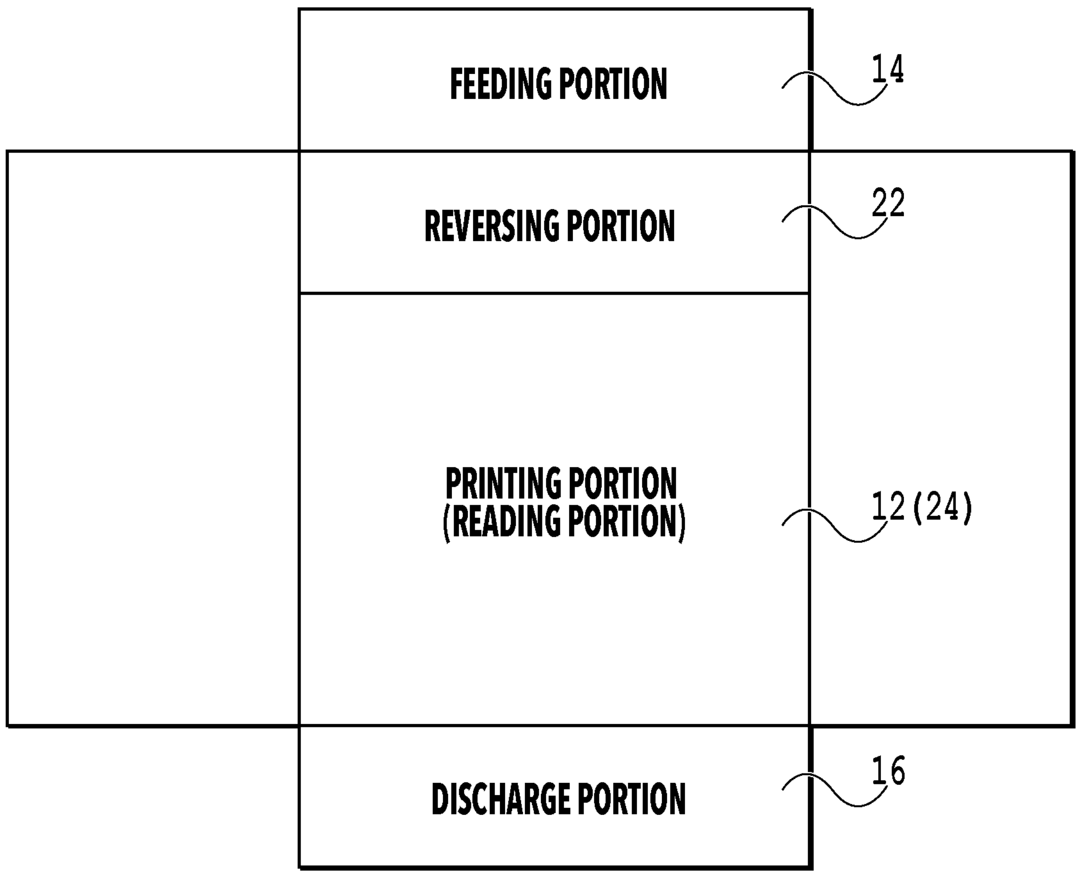
FIG. 2 is a diagram showing a positional relationship among main constituent members of the printing apparatus.
Figure 3:
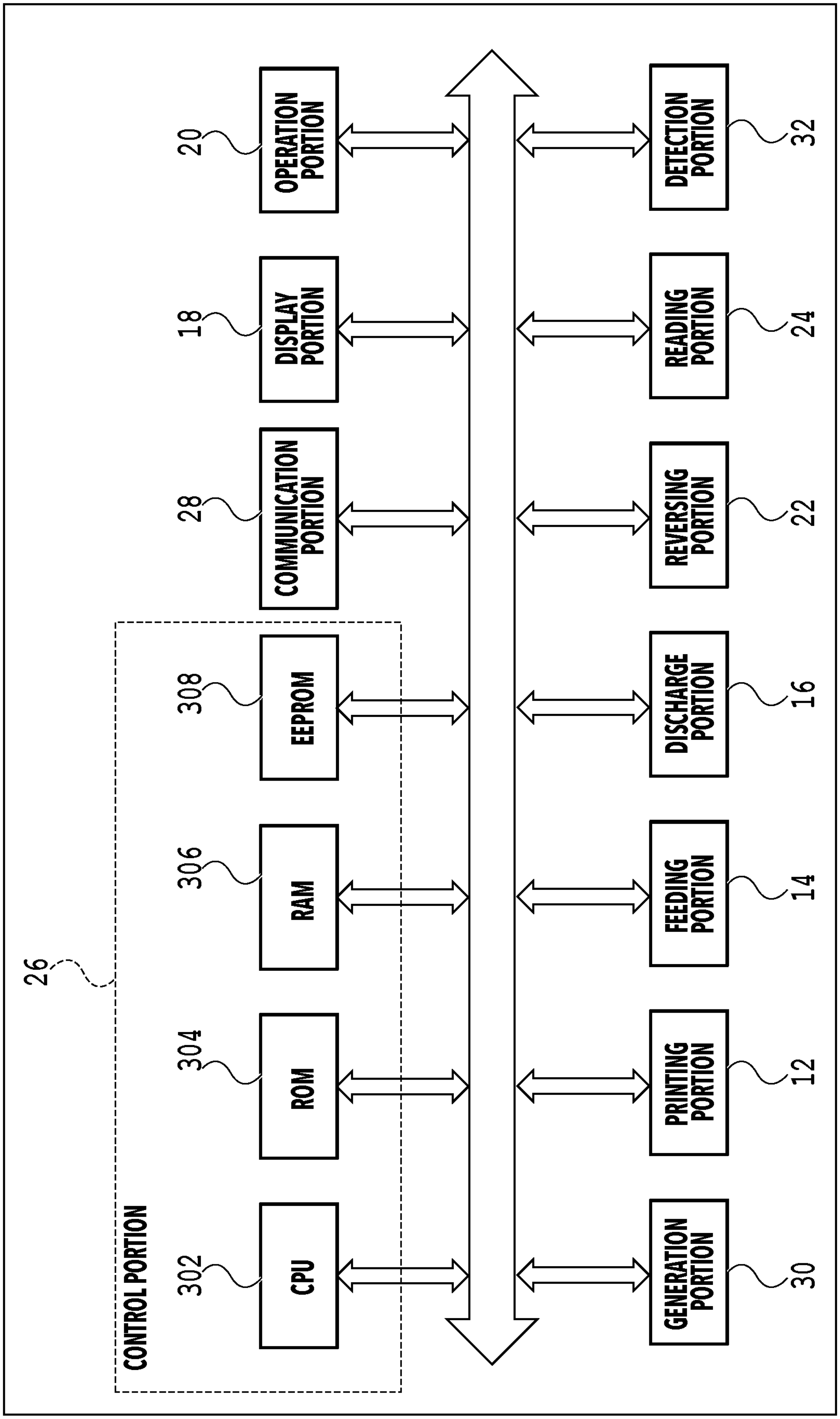
FIG. 3 is a block diagram showing a hardware configuration of the printing apparatus.

FIG. 1 is a schematic configuration diagram of the printing apparatus. FIG. 2 is a diagram showing a positional relationship among main constituent members in the printing apparatus. FIG. 3 is a block diagram showing a hardware configuration of the printing apparatus.

The printing apparatus 10 comprises a printing portion 12 which ejects ink to and performs printing on a printing medium, a feeding portion 14 which feeds a printing medium to the printing portion 12, and a discharge portion 16 which discharges a printing medium printed in the printing portion 12. The printing apparatus 10 also comprises a display portion 18 capable of displaying various types of information and an operation portion 20 which enables operation according to the content displayed on the display portion 18. The printing apparatus 10 further comprises a reversing portion 22 which reverses a printing side of a printing medium printed in the printing portion 12 to switch a printing side facing the print head and a reading portion 24 capable of reading an image on a printing side of a printing medium. The printing apparatus 10 further comprises a control portion 26 which controls the entire operation, a communication portion 28 connected to an external apparatus in a communicable manner, and a generation portion 30 which generates print (print) data printable in the printing apparatus from input image data. The printing apparatus 10 also comprises a detection portion 32 capable of detecting whether a printing medium undergoing processing such as printing has been removed.

More specifically, the printing portion 12 comprises a print head (not shown) capable of ejecting ink, which is a printing material, by an inkjet method and performing printing on a printing medium fed from the feeding portion 14. The printing portion 12 performs a print operation of ejecting ink while moving the print head in an X direction with respect to a printing medium fed to a printing start position by the feeding portion 14 based on print data. The print operation is followed by a conveying operation of conveying the printing medium by a predetermined amount in a Y direction. After that, the print operation is performed again. The printing apparatus 10 alternately repeats the print operation and the conveying operation and thereby prints a predetermined image on the printing medium. Incidentally, although the printing apparatus 10 is described as an inkjet printing apparatus in the present embodiment, the printing method in the printing portion 12 is not limited to the one explained above and various publicly-known techniques are applicable. For example, the printing method may be an electrophotographic method. In this case, the printing material is toner.

The feeding portion 14 is located upstream of the printing portion 12 in the +Y direction and comprises a feeding tray **14*a* to place a printing medium before printing. The feeding portion 14 feeds a printing medium placed on the feeding tray 14*a* to the printing start position for the printing portion 12. The discharge portion 16 is located downstream of the printing portion 12 in the +Y direction and comprises a discharge tray 16*a* to place a printing medium after printing. The discharge portion 16 is configured to discharge a printing medium printed by the printing portion 12 to the discharge tray 16*a* protruding externally from the printing apparatus 10**.

The display portion 18 is constituted of, for example, a liquid crystal display device, and can display characters, figures, indexes (indicators), and the like. Incidentally, the display portion 18 is not limited to the liquid crystal display device and may be formed by the use of an LED or any of various publicly-known display devices. Examples of the information displayed on the display portion 18 include setting information in the printing apparatus 10 and ink-related information such as an ink remaining amount and a type of ink in an ink tank storing ink to be ejected from the print head. The display on the display portion 18 is controlled by the control portion 26. The operation portion 20 is constituted of a switch, hard key, and the like for a user to perform various input operations. The operation portion 20 may be formed by a touch panel together with the display portion 18.

The reversing portion 22 is located, for example, between the printing portion 12 and the feeding portion 14 in the Y direction. The reversing portion 22 reverses a printing side of a printing medium printed by the printing portion 12 and makes the other printing side of the printing medium printable by the printing portion 12. Incidentally, a printing side means a side of a printing medium to which ink is ejected from the print head of the printing portion 12.

The reading portion 24 is configured to read an image printed on a printing medium. More specifically, the reading portion 24 is provided on a carriage which moves the print head of the printing portion 12 in the X direction. The reading portion 24 performs a reading operation of reading a printed image on a printing medium while moving in the X direction via the carriage with respect to the printing medium conveyed to a reading start position. The reading operation is followed by a conveying operation of conveying the printing medium by a predetermined amount in the Y direction. After that, the reading operation is performed again. The printing apparatus 10 alternately repeats the reading operation and the conveying operation and thereby reads the printed image on the printing medium. Incidentally, the configuration of the reading portion 24 is not limited to the above one. For example, it is possible to apply a publicly-known reading technique such as a configuration in which a reading sensor is provided to extend in the X direction and a printed image on a printing medium is read by conveying the printing medium under the reading sensor.

The control portion 26 comprises a CPU 302, a ROM 304, a RAM 306, and an EEPROM 308. The CPU 302 is a central processing unit to control each constituent of the printing apparatus 10. The CPU 302 also performs various types of processing such as an analysis of an image read by the reading portion 24. The ROM 304 stores various program codes executed by the CPU 302. The RAM 306 functions as a temporal storage area such as a work area of the CPU 302. The EEPROM 308 is a nonvolatile memory storing, for example, information on a shipping destination of the printing apparatus 10 and language settings for display on the display portion 18.

The communication portion 28 is connectable to an external apparatus via a USB (Universal Serial Bus) or a network. That is, the communication portion 28 is connected to a USB or a network and communicates with an external apparatus. The generation portion 30 generates print data printable by the printing portion 12 from image data input from an external apparatus via the communication portion 28. Incidentally, the image data is not limited to an image that a user wants to print on a printing medium but includes, for example, nozzle check data designated by a user and pattern data on an adjustment pattern for a head adjustment. The detection portion 32 is a constituent to detect whether a printing medium undergoing printing (including waiting for ink drying) has been removed from the printing apparatus 10. Since a publicly-known technique can be used for a specific configuration of the detection portion 32, the detailed description thereof is omitted.

In the printing apparatus 10, the constituents described above are connected to each other via a bus 310 and can transmit/receive data to/from each other. Incidentally, although the printing apparatus which performs printing on a printing medium is described as an example in the present embodiment, the technique of the present embodiment is also applicable to various publicly-known apparatuses having the function of printing on both of front and back sides of a printing medium, such as a multifunction peripheral equipped with a scanner. Further, the head adjustment is automatically performed in the present embodiment but is not limited to this and may be semi-automatically performed as disclosed in Patent Literature 1.

Problem of Publicly-Known Technique

The printing apparatus 10 is capable of single-sided printing, in which one side (front side) of a printing medium is printed, and double-sided printing, in which one side and the other side (back side) of a printing medium are printed. FIGS. 4A to 4F are diagrams showing positions of a printing medium in the printing apparatus at the time of single-sided printing and double-sided printing.

Figure 4A:
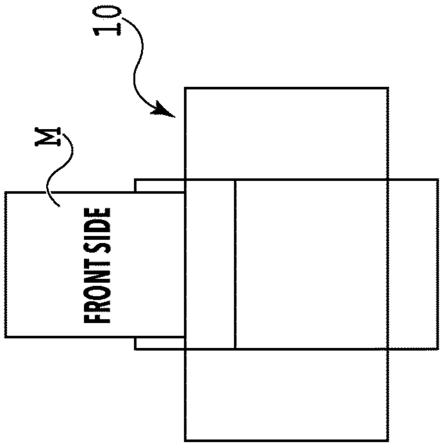
FIGS. 4A to 4F are diagrams showing positions of a printing medium in the printing apparatus at the time of printing.
Figure 4B:
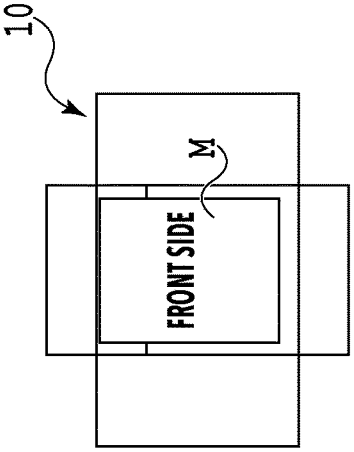

In single-sided printing, a printing medium M is first placed on the feeding tray **14*a* of the feeding portion 14 (see FIG. 4A), the printing medium M is fed to the printing start position by the feeding portion 14, and the printing portion 12 performs printing on a front side of the printing medium M (see FIG. 4B). After the printing is finished by the printing portion 12, the printed printing medium M is discharged to the discharge tray 16*a* by the discharge portion 16. The front side of the printing medium M discharged to the discharge tray 16*a*** is exposed to the outside.

Figure 4C:
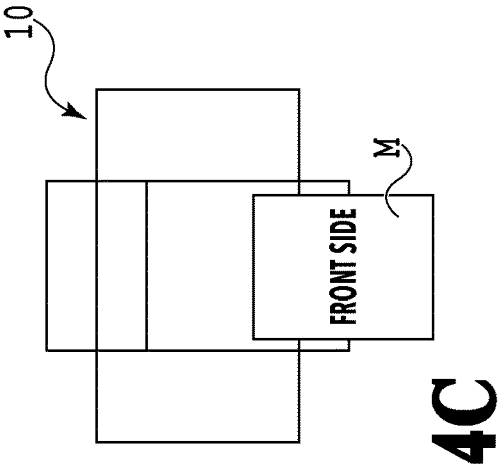
Figure 4D:
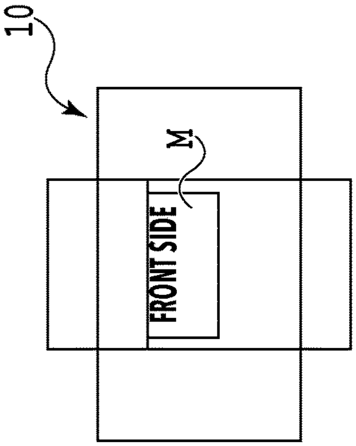
Figure 4E:
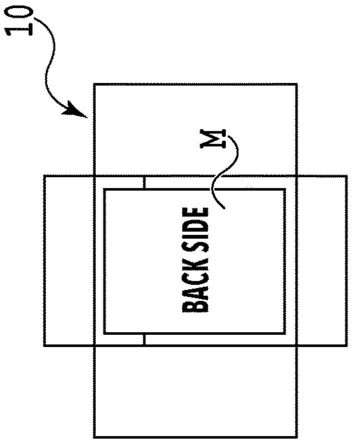
Figure 4F:
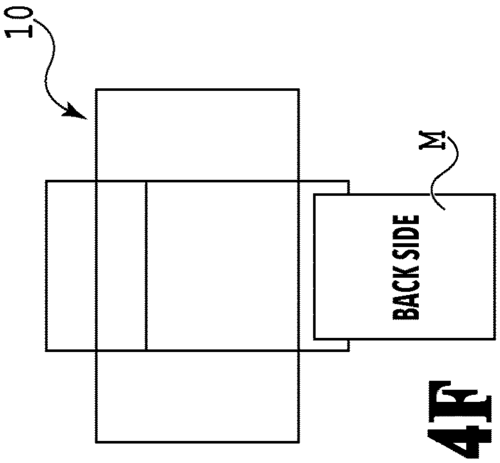

On the other hand, in double-sided printing, printing is performed on a front side of a printing medium M like the single-sided printing, but a part of the printing medium M is located on the discharge tray **16*a* and exposed to the outside of the apparatus during printing (see FIG. 4C). After the printing on the front side is finished, the printing medium M is pulled back and conveyed to the reversing portion 22 and then reversed in the reversing portion 22 (see FIG. 4D). After that, the printing portion 12 performs printing on the back side of the printing medium M (see FIG. 4E) and the printed printing medium M is discharged to the discharge tray 16*a* by the discharge portion 16 (see FIG. 4**F).

In the printing apparatus 10, in the case of performing a head adjustment process, which is a process for adjusting a landing position of ink, a head adjustment pattern (adjustment process pattern) is first printed on a printing medium. Incidentally, the head adjustment pattern means a pattern for a registration adjustment and is hereinafter referred to as "adjustment pattern" as appropriate. The adjustment pattern printed on the printing medium is then read by the reading portion 24. After that, the control portion 26 analyzes the read information and obtains information for correcting a landing position of ink based on the analysis result. At the time of printing, the control portion 26 corrects the landing position of ink based on the information and performs control to eject ink from the print head. Incidentally, single-sided printing and double-sided printing are available for printing of the adjustment pattern for the head adjustment process; the printing apparatus 10 can perform both or either of single-sided printing and double-sided printing of the adjustment pattern. In double-sided adjustment pattern printing, adjustment patterns printed on the front and back sides of a printing medium may be either different from or identical to each other.

Since the printing apparatus 10 is capable of double-sided printing, there is a need to perform both a head adjustment for printing on a front side and a head adjustment for printing on a back side. More specifically, the printing portion 12 first prints an adjustment pattern on a front side of a printing medium fed from the feeding portion 14. After the printing of the adjustment pattern on the printing medium, the printing medium waits a predetermined time at a predetermined position for drying of ink ejected on the front side. The printing medium is then pulled back and conveyed to the reversing portion 22 and reversed by the reversing portion 22. After that, the printing portion 12 prints an adjustment pattern on the back side of the printing medium. After the printing, the printing medium waits a predetermined time at a predetermined position for drying of ink ejected on the back side.

Next, the printing medium is pulled back and conveyed to the reversing portion 22 and reversed by the reversing portion 22, and the reading portion 24 reads the adjustment pattern printed on the front side. After the reading of the adjustment pattern on the front side is finished, the printing medium is pulled back and conveyed to the reversing portion 22 and reversed by the reversing portion 22, and the reading portion 24 reads the adjustment pattern printed on the back side. After that, the control portion 26 analyzes the read adjustment patterns on the front and back sides and obtains information for correcting a landing position of ink based on the analysis. Incidentally, since various publicly-known techniques can be used to analyze the read adjustment patterns and obtain information for correcting a landing position of ink, the detailed description thereof is omitted.

As stated above, in the case of performing the head adjustment process, the adjustment pattern is printed on the front and back sides of the printing medium, but the printing medium with the front side printed waits for ink drying before the printing medium is reversed. At this time, the printing medium is exposed to the outside of the apparatus as shown in FIG. 4C. Accordingly, a user may mistake the waiting printing medium for being finished with the head adjustment process and remove the printing medium from the printing apparatus 10. If the printing medium is thus removed during the printing of the adjustment pattern, the printing apparatus 10 determines that the head adjustment process has not been appropriately performed and stops the head adjustment process.

Incidentally, also in single-sided printing of the adjustment pattern in the head adjustment process, the same problem arises in a case where a printing medium with its front side printed is exposed to the outside of the printing apparatus 10 to wait for drying and is then pulled back to read the adjustment pattern printed on the front side. Further, also in double-sided printing of the adjustment pattern in the head adjustment process, the same problem arises in a case where a printing medium with its back side printed is exposed to the outside of the printing apparatus 10 to wait for drying and is then pulled back to read the adjustment patterns printed on both the sides. Accordingly, the process described below is also applicable to the above cases, that is, cases where there is a need to prohibit (or suppress) a user from removing a printing medium in the execution of the process of exposing the printing medium subjected to a printing process to the outside of the printing apparatus 10 and then pulling the printing medium back to the printing apparatus 10.

Characteristic Technique of Present Embodiment

Thus, in the present embodiment, identification information for prohibiting (or suppressing) a user from touching a printing medium is notified at the time of printing the adjustment pattern in order to prohibit (or suppress) a user from removing the printing medium during printing. More specifically, at the time of printing on a front side of a printing medium, an illustration or character string to prohibit (or suppress) touching the printing medium is printed on the printing medium, or an animation, guidance, character string, or message to prohibit (or suppress) touching the printing medium is displayed on the display portion 18.

In the present embodiment, the head adjustment process for adjusting a landing position of ink is performed at a predetermined time such as the time of initial setup after arrival or the time of print head replacement. In the head adjustment process, the adjustment pattern printing process for printing an adjustment pattern is performed for both sides of a printing medium, followed by reading of the adjustment patterns printed on both the sides of the printing medium. After that, the read adjustment patterns are analyzed by the control portion 26 to obtain information for correcting a landing position of ink. Since various publicly-known techniques can be used to read the adjustment patterns and analyze the read adjustment patterns, the detailed description thereof is omitted.

Adjustment Pattern Printing Process

Figure 5:
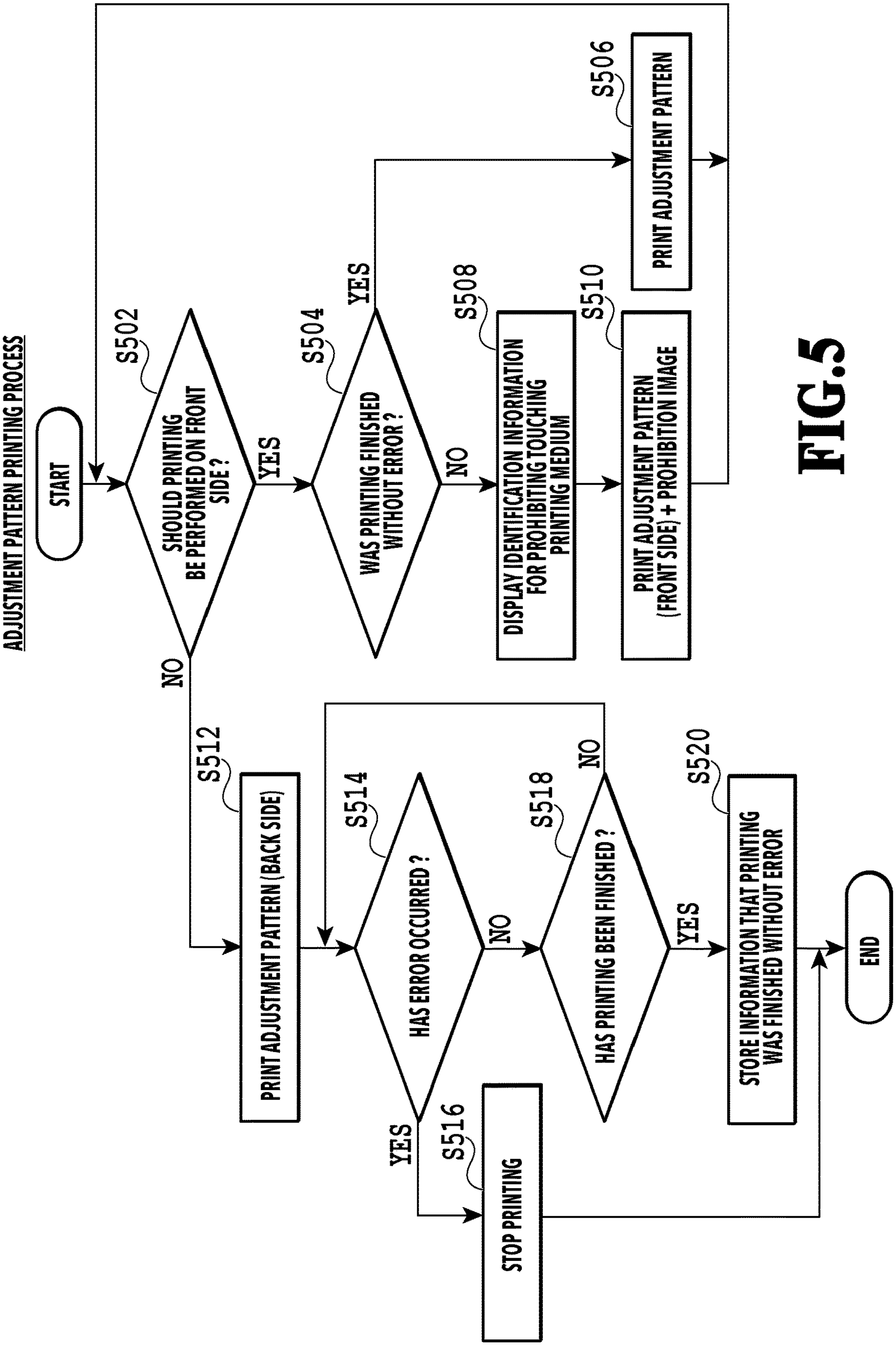
FIG. 5 is a flowchart showing the content of an adjustment pattern printing process.

The adjustment pattern printing process for printing an adjustment pattern on both sides of a printing medium will be described below in detail. FIG. 5 is a flowchart showing a detailed processing routine of the adjustment pattern printing process. The procedure shown in the flowchart of FIG. 5 is performed by the CPU 302 loading a program code stored in the ROM 304 into the RAM 306 and executing the program code. Alternatively, part or all of the functions of the steps in FIG. 5 may be executed by hardware such as an ASIC or electric circuit. Incidentally, sign S in the description of each process means a step in the flowchart (the same applies hereinafter).

If the adjustment pattern printing process is started, the CPU 302 first determines whether printing should be performed on the front side of the printing medium (S502). In S502, for example, it is determined whether the printing medium has been fed from the feeding portion 14 or reversed in the reversing portion 22. The determination is made, for example, based on the detection of the printing medium by sensors provided in the feeding portion 14 and the reversing portion 22. In this case, in S502, if the printing medium is fed from the feeding portion 14, it is determined that printing should be performed on the front side of the printing medium. If the printing medium is conveyed from the reversing portion 22, it is determined that printing should be performed on the back side, not the front side, of the printing medium. Incidentally, this determination method is just an example and various publicly-known techniques are applicable.

If it is determined in S502 that printing should be performed on the front side of the printing medium, the CPU 302 determines whether an adjustment pattern was printed without error (S504). As will be described later in detail, in the case of printing an adjustment pattern, the printing apparatus 10 detects an error upon removal of a printing medium undergoing printing, that is, removal of a printing medium from the printing apparatus 10 before the finish of printing of the adjustment pattern on both sides, and stores the error detection in the storage area. S504 determines whether the adjustment pattern was printed without the above error in the last printing process.

A storage area such as the EEPROM 308 stores, as error-related information, whether or not the adjustment pattern was printed without error. Accordingly, based on the error-related information stored in the storage area, it is determined in S504 whether or not the adjustment pattern was printed without error. That is, if the storage area stores information that the adjustment pattern was printed without error, it is determined in S504 that the adjustment pattern was printed without error. If the storage area stores information that the adjustment pattern was not printed without error, it is determined that the adjustment pattern was not printed without error. An initial value of the error-related information is that "the adjustment pattern was not printed without error." Alternatively, the determination may be made based on whether error detection has been stored. The process advances to S508 if it is determined that error detection has been stored, and proceeds to S506 if it is determined that error detection has not been stored. That is, if a user removed a printing medium during the last printing of the adjustment process pattern, control is executed so as to perform printing to prohibit (or suppress) a user from removing a printing medium. If a user did not remove a printing medium during the last printing of the adjustment process pattern, control is executed so as not to perform printing to prohibit (or suppress) a user from removing a printing medium.

If it is determined in S504 that the adjustment pattern was printed without error, the adjustment pattern is printed on the front side of the printing medium based on print data on the adjustment pattern generated in the generation portion 30 (S506), and the process returns to S502. Incidentally, since any publicly-known adjustment pattern can be used as the adjustment pattern, the detailed illustration and description thereof are omitted herein. As described above, in the present embodiment, the CPU 302 functions as a printing control portion which controls the printing portion 12 and the like to print the adjustment pattern on the front side of the printing medium.

Figure 6:
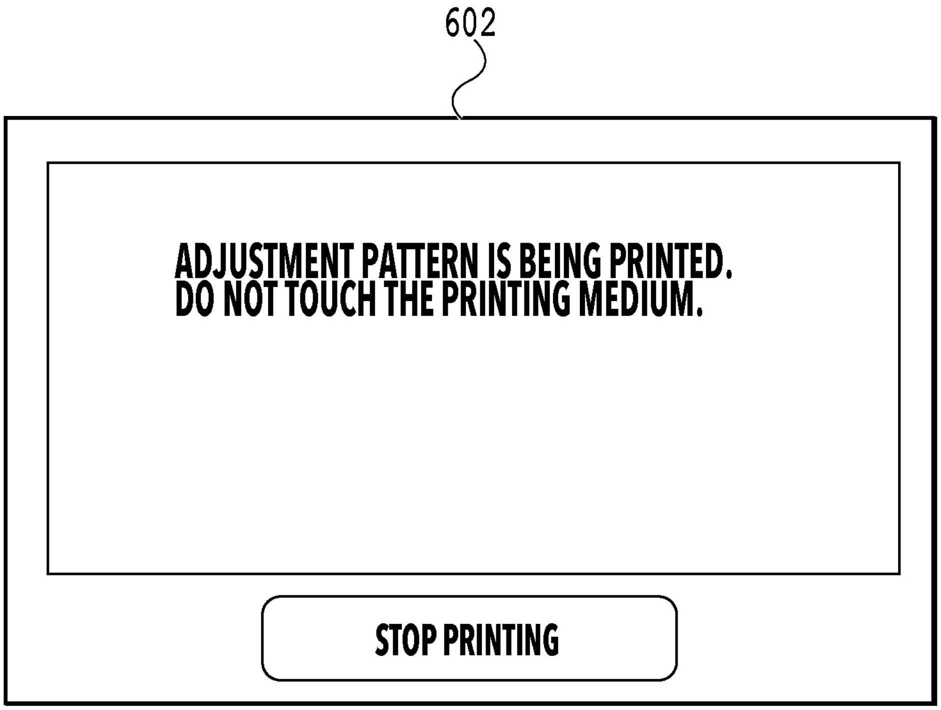
FIG. 6 is a diagram showing a display screen in which an example of a display to prohibit (or suppress) touching a printing medium is displayed.

If it is determined in S504 that the adjustment pattern was not printed without error, the CPU 302 displays identification information for prohibiting (or suppressing) touching the printing medium on the display portion 18 (S508). The display of the identification information for prohibiting (or suppressing) touching the printing medium is, for example, an animation, guidance, or character string from which a user can easily recognize that the printing medium must not be touched (or must be suppressed from being touched). FIG. 6 is a diagram showing a display screen in which an example of a display to prohibit (or suppress) touching the printing medium is displayed. In S508, a display screen 602 as shown in FIG. 6 is displayed on the display portion 18. That is, the CPU 302 displays, on the display portion 18, identification information indicating the head adjustment process and the identification information for prohibiting (or suppressing) touching the printing medium. Incidentally, the message shown in the display screen 602 is just an example and may be, for example, "Adjustment is being performed to improve print quality. Do not extract the sheet" or "<Image position adjustment> Printing is being performed. Do not touch the printing medium." Further, the identification information displayed to prohibit (suppress) touching the printing medium may be "Do not remove the printing medium" or "Do not touch the printer" (not shown). Additionally, a time required for completion of the head adjustment process may be displayed on the display screen 602 (not shown).

The display of the identification information for prohibiting (or suppressing) touching the printing medium on the display portion 18 is started in S508 in the flowchart of FIG. 5 and continued until the head adjustment process is finished. However, the identification information for prohibiting (or suppressing) touching the printing medium may be displayed on the display portion 18 until the printing of the adjustment pattern on the front side is finished. In other words, the screen of FIG. 6 may be displayed on the display portion 18 from S508 of FIG. 5 to the end of the flowchart.

Further, the display of the identification information for prohibiting (or suppressing) touching the printing medium on the display portion 18 may be stopped based on completion of printing of the adjustment pattern on the front side. More specifically, the process may be executed such that the identification information "Do not touch the printing medium" in the screen of FIG. 6 is not displayed on the display portion 18 if the determination result is NO in S502 of FIG. 5. In this case, the identification information "Adjustment pattern is being printed" indicating the head adjustment process in the screen of FIG. 6 is displayed on the display portion 18 from S508 in the flowchart of FIG. 5 to the end of the flowchart.

As described above, a period during which the identification information for prohibiting (or suppressing) touching the printing medium is displayed on the display portion 18 may be any period provided that it includes a time in which there is at least a need to prohibit (or suppress) a user from removing the printing medium. The time in which there is at least a need to prohibit (or suppress) a user from removing the printing medium is, for example, a time in which the printing medium is exposed to the outside of the printing apparatus 10 before being pulled back to the printing apparatus 10. In this manner, in the present embodiment, the CPU 302 functions as a notification portion which performs a notification process of displaying the identification information indicating the head adjustment process and the identification information for prohibiting (or suppressing) touching the printing medium on the display portion 18 and notifying a user of the identification information.

Returning to FIG. 5, based on additional print data in which an image to prohibit (or suppress) touching the printing medium is added to the outside of a print area of the adjustment pattern, the CPU 302 prints the image together with the adjustment pattern on the front side of the printing medium (S510) and then returns to S502. To be more specific, the additional print data is data obtained by adding print data on a prohibition (or suppression) image, which is an illustration and character string to prohibit (or suppress) touching the printing medium, to the print data on the adjustment pattern generated in the generation portion 30. For example, the print data on the prohibition (or suppression) image is stored in the storage area of the printing apparatus 10. The additional print data may be generated in advance at the time of generating print data on the adjustment pattern in the generation portion 30, or may be generated by combining the print data on the adjustment pattern with the print data on the prohibition (or suppression) image in the CPU 302 at the time of printing in S510.

Figure 7:
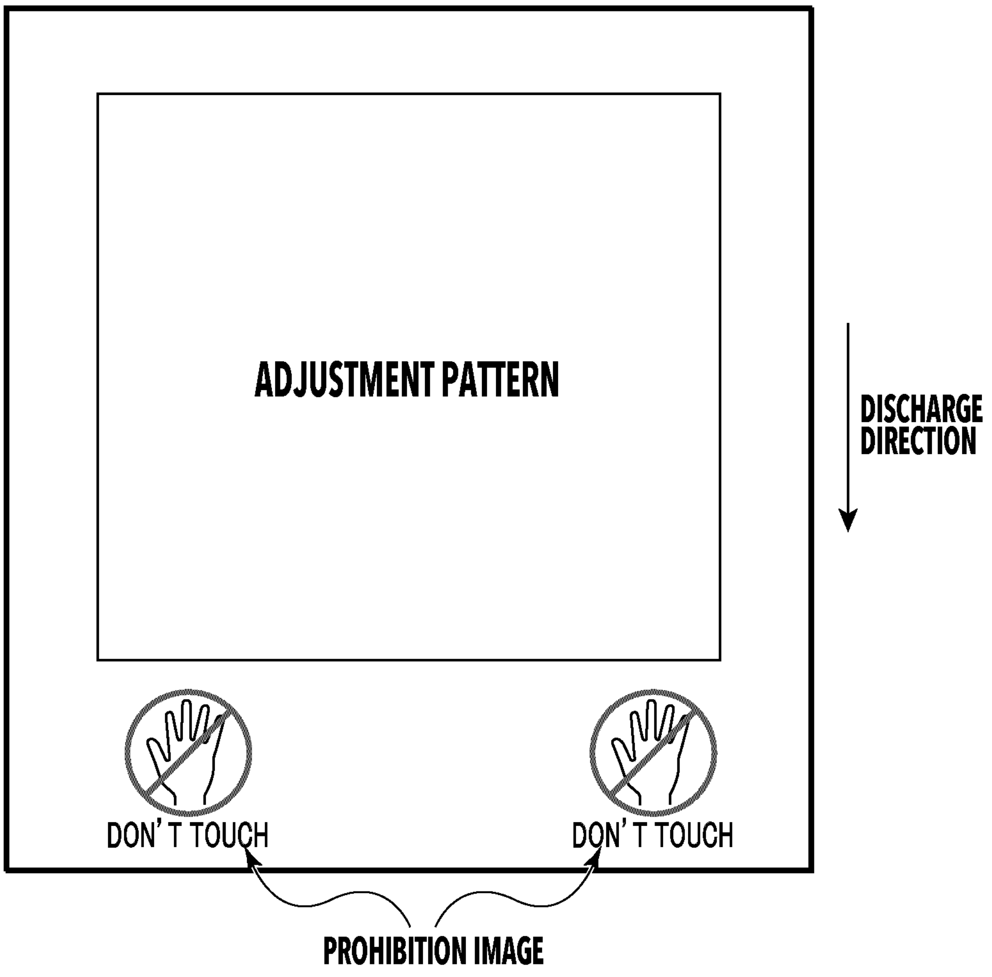
FIG. 7 is a diagram showing an example of a prohibition (or suppression) image printed on a printing medium.

On the printing medium, the prohibition (or suppression) image is located in a position exposed to the outside of the printing apparatus 10 and easily visible to a user during printing of the adjustment pattern on the front side and during waiting for ink drying after the printing on the front side. The prohibition (or suppression) image should be an illustration, icon, or character string from which a user can easily recognize that the printing medium must not be touched. For example, an image or icon to prohibit (or suppress) touching the printing medium may be printed on the printing medium together with the following identification information indicating the head adjustment process: "Adjustment is being performed to improve print quality. Do not extract the sheet." Further, the prohibition (or suppression) image may have a color easy to attract a user's attention, a conspicuous color, or a color that enhances user recognition, such as red. FIG. 7 is a diagram showing a printed image based on the additional print data obtained by adding an example of the prohibition (or suppression) image. Although FIG. 7 shows the character string "adjustment pattern" in an area to print the adjustment pattern, a publicly-known adjustment pattern is formed here in an actual printed image.

In S510, an image as shown in FIG. 7 is printed on the printing medium. In FIG. 7, prohibition (or suppression) images are printed in the vicinity of the downstream end of the printing medium in a discharge direction in which the printing medium is discharged. Since the downstream side of the printing medium in the discharge direction is exposed to the outside of the printing apparatus 10 during printing and waiting, the prohibition (or suppression) images are printed in the position shown in FIG. 7, whereby a user can easily see the prohibition (or suppression) images. Incidentally, the position to print the prohibition (or suppression) image is not limited to the vicinity of the downstream end in the discharge direction and may be any position as long as it is easily visible to a user during printing on the front side. Incidentally, the identification information indicating the head adjustment process is information that enables a user to recognize that the head adjustment process is being performed. Thus, for example, the adjustment pattern printed by the printing portion 12 can also be regarded as the identification information indicating the head adjustment process. Accordingly, in the present embodiment, the CPU 302 functions as a notification portion which performs a notification process of printing the identification information indicating the head adjustment process and the identification information to prohibit (or suppress) touching the printing medium on the printing medium by means of a printing unit and notifying a user of the identification information.

Returning to FIG. 5, if it is determined in S502 that printing should be performed not on the front side of the printing medium, the CPU 302 prints the adjustment pattern on the back side of the printing medium based on the print data on the adjustment pattern generated in the generation portion 30 (S512). That is, the printing of the adjustment pattern on the back side of the printing medium is started in S512. In this manner, in the present embodiment, the CPU 302 functions as a printing control portion which controls the printing portion 12 and the like to print the adjustment pattern on the back side of the printing medium. The CPU 302 then determines whether an error has occurred (S514). In S514, it is determined whether the printed medium has been removed during the printing of the adjustment pattern on the back side based on the result of detection by the detection portion 32. In S514, if the printing medium has been removed, it is determined that an error has occurred; if the printing medium has not been removed, it is determined that an error has not occurred.

If it is determined in S514 that an error has occurred, the CPU 302 stops printing (S516) and finishes the adjustment pattern printing process. At this time, the display portion 18 may display a notification that an error has occurred or an instruction to fix an error. In S516, the error-related information stored in the storage area is updated to "the adjustment pattern was not printed without error."

If it is determined in S514 that an error has not occurred, the CPU 302 determines whether the printing of the adjustment pattern has been finished (S518). If it is determined in S518 that the printing of the adjustment pattern has not been finished, the process returns to S514. If it is determined in S518 that the printing of the adjustment pattern has been finished, the error-related information stored in the storage area is updated to "the adjustment pattern was printed without error" (S520) and the adjustment pattern printing process is finished.

As described above, according to the present embodiment, a notification to prohibit (or suppress) touching a printing medium is made at the time of printing the adjustment pattern on the front side in the adjustment pattern printing process in the head adjustment process. More specifically, the prohibition (or suppression) image to prohibit (or suppress) touching the printing medium is additionally printed and the display to prohibit (or suppress) touching the printing medium is made on the display portion 18. This can prohibit (or suppress) the occurrence of an error which is caused by removal of the printing medium by a user in the adjustment pattern printing process and disables an appropriate head adjustment.

Incidentally, in the above embodiment, the notification to prohibit (or suppress) touching the printing medium is made in a case where the adjustment pattern is printed on the front side in the adjustment pattern printing process in the head adjustment process. On the other hand, in execution of normal double-sided printing, the CPU 302 executes control to display indication information (such as a character string or message) indicating that printing is being performed on the display portion 18 but does not execute control to notify prohibition (or suppression) of touching the printing medium. For example, in execution of normal double-sided printing, the CPU 302 displays a message "Printing is being performed" on the display portion 18 without displaying a character string or message to prohibit (or suppress) touching the printing medium. The CPU 302 also does not print on the printing medium an image or icon to prohibit (or suppress) touching the printing medium. Incidentally, the execution of normal double-sided printing means that a print job having a setting of double-sided printing of print data on a first side of a printing medium and a second side, which is the back side of the first side, is executed under user instructions.

Further, in the above embodiment, as the notification process for prohibiting (or suppressing) touching the printing medium, the prohibition (or suppression) image to prohibit (or suppress) touching the printing medium is additionally printed and the display to prohibit (or suppress) touching the printing medium is displayed on the display portion 18. However, at least one of the above printing and display processes may be executed as the notification process. That is, after the execution of S508 of FIG. 5, the printing process of the adjustment pattern may be performed in S510 without executing the process of printing on the printing medium an image or icon to prohibit (or suppress) touching the printing medium. Alternatively, S510 may be executed without executing S508.

Further, in the present embodiment, if the adjustment pattern is printed without error, the next adjustment pattern printing process is performed without printing the prohibition (or suppression) image or making the display of prohibition (or suppression) of touching the printing medium. This enables prohibition (or suppression) of consumption of ink, printing medium, and power.

Second Embodiment

Figure 8:
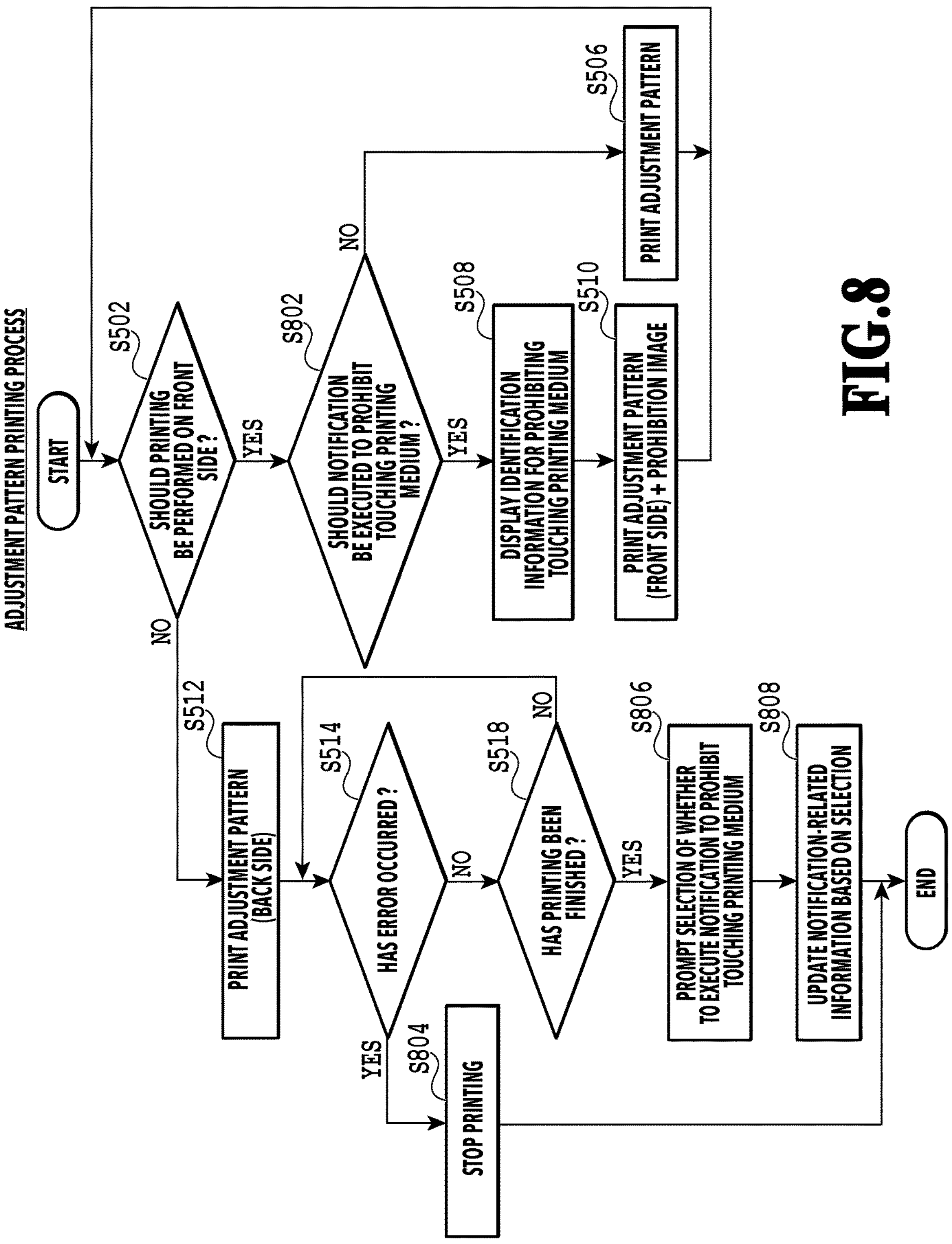
FIG. 8 is a flowchart showing the content of an adjustment pattern printing process according to another embodiment.

Next, a printing apparatus according to a second embodiment will be described with reference to FIG. 8 and FIG. 9. In the following description, constituents identical or corresponding to those of the printing apparatus of the above-described first embodiment will be denoted by the same reference numerals as those used in the first embodiment to omit the detailed description thereof.

The second embodiment is different from the first embodiment described above in that in the adjustment pattern printing process in the head adjustment process, if the printing on the back side is finished without error, a user is allowed to select whether to make a notification to prohibit (or suppress) touching a printing medium.

In the present embodiment, as information related to a notification to prohibit (or suppress) touching a printing medium, the storage area such as the EEPROM 308 stores execution or non-execution of the notification. In the following description, "information related to a notification to prohibit (or suppress) touching a printing medium" is simply referred to as "notification-related information" as appropriate. An initial value of the notification-related information is that "a notification to prohibit (or suppress) touching a printing medium should be executed." Based on the notification-related information, the CPU 302 determines whether to make a notification to prohibit (or suppress) touching a printing medium at the time of printing on the front side of the printing medium.

Adjustment Pattern Printing Process

A description will be given of an adjustment pattern printing process executed in the present embodiment. FIG. 8 is a flowchart showing a detailed processing routine of the adjustment pattern printing process executed in the present embodiment. The procedure shown in the flowchart of FIG. 8 is performed by the CPU 302 loading a program code stored in the ROM 304 into the RAM 306 and executing the program code. Alternatively, part or all of the functions of the steps in FIG. 8 may be executed by hardware such as an ASIC or electric circuit. Incidentally, in the flowchart of FIG. 8, a step of performing processing identical to that of FIG. 5 is denoted by the same step number and the detailed description of the processing is omitted.

If the adjustment pattern printing process is started, it is first determined in S502 whether printing should be performed on the front side of the printing medium. If it is determined that printing should be performed on the front side of the printing medium, the CPU 302 determines whether to execute a notification to prohibit (or suppress) touching the printing medium (S802). In the present embodiment, the storage area such as the EEPROM 308 stores the notification-related information indicating whether to execute a notification to prohibit (or suppress) touching a printing medium. Accordingly, the determination is made in S802 based on the notification-related information. That is, if the execution of a notification to prohibit (or suppress) touching a printing medium is stored as the notification-related information, it is determined in S802 that a notification to prohibit (or suppress) touching the printing medium should be executed. If the non-execution of a notification to prohibit (or suppress) touching a printing medium is stored as the notification-related information, it is determined that a notification to prohibit (or suppress) touching the printing medium should not be executed.

If it is determined in S802 that a notification to prohibit (or suppress) touching the printing medium should not be executed, the process advances to S506, where the adjustment pattern is printed on the front side of the printing medium, and then returns to S502. If it is determined in S802 that a notification to prohibit (or suppress) touching the printing medium should be executed, the process advances to S508, where a display to prohibit (or suppress) touching the printing medium is made on the display portion 18. After that, in S510, the prohibition (or suppression) image is printed together with the adjustment pattern on the front side of the printing medium based on the additional print data and the process returns to S502.

On the other hand, it is determined in S502 that printing should be performed not on the front side of the printing medium, the adjustment pattern is printed on the back side of the printing medium in S512 and it is determined in S514 whether an error has occurred. If it is determined in S514 that an error has occurred, the CPU 302 stops printing (S804) and finishes the adjustment pattern printing process. At this time, the display portion 18 may display a notification that an error has occurred or a process to fix an error. In S804, the notification-related information stored in the storage area is updated to "a notification to prohibit (or suppress) touching a printing medium should be executed."

If it is determined in S514 that an error has not occurred, it is determined in S518 whether the printing has been finished. If it is determined that the printing has not been finished, the process returns to S514. If it is determined in S518 that the printing has been finished, the CPU 302 prompts a user to select whether to execute a notification to prohibit (or suppress) touching a printing medium (S806). In S806, the display portion 18 displays a selection screen which prompts a user to select whether to execute a notification to prohibit (or suppress) touching a printing medium.

Figure 9:
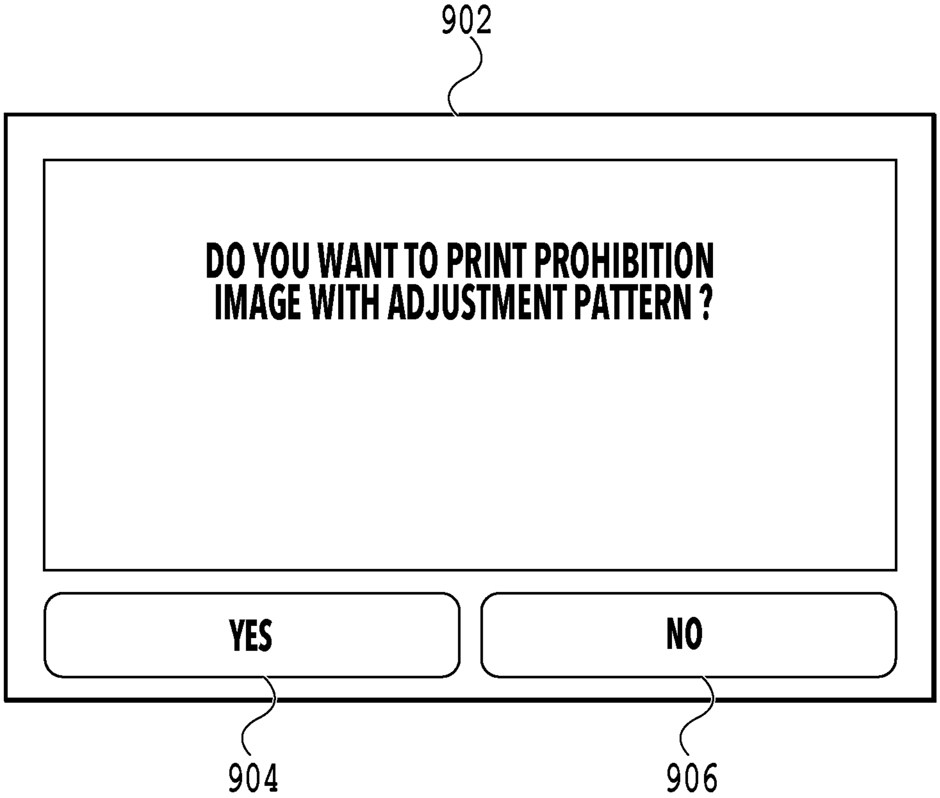
FIG. 9 is a diagram showing a selection screen which prompts selection of execution of a notification to prohibit (or suppress) touching a printing medium.

FIG. 9 is a diagram showing an example of the selection screen which allows selecting whether to execute a notification to prohibit (or suppress) touching a printing medium. In S806, the display portion 18 displays a selection screen 902 as shown in FIG. 9. As the selection of whether to execute a notification to prohibit (or suppress) touching a printing medium, the selection screen 902 of FIG. 9 displays a character string which prompts selection of whether to print a prohibition (or suppression) image with the adjustment pattern. The selection screen 902 also displays a "YES" button 904 and a "NO" button 906 which are selectable by a user. Although the selection screen displayed on the display portion 18 shows the character string which prompts selection of whether to print a prohibition (or suppression) image as the representation of selection of whether to execute a notification to prohibit (or suppress) touching a printing medium, the representation is not limited to this and may be an animation or image, or those combined with a character string.

After that, the CPU 302 updates the notification-related information stored in the storage area based on the result of user selection on the selection screen 902 (S808) and finishes the adjustment pattern printing process. In S808, if a user selects the "YES" button 904 on the selection screen 902, the notification-related information in the storage area is updated to "a notification to prohibit (or suppress) touching a printing medium should be executed." If a user selects the "NO" button 906 on the selection screen 902, the notification-related information in the storage area is updated to "a notification to prohibit (or suppress) touching a printing medium should not be executed."

As described above, in the present embodiment, a notification to prohibit (or suppress) touching a printing medium is made at the time of printing the adjustment pattern on the front side in the adjustment pattern printing process in the head adjustment process like the first embodiment. Further, in the present embodiment, a notification to prohibit (or suppress) touching a printing medium is executed according to user selection. This produces the same advantageous result as that of the first embodiment.

Furthermore, since whether to execute a notification to prohibit (or suppress) touching a printing medium can be determined according to user selection, the occurrence of an error that disables an appropriate head adjustment can be suppressed even in a case where the printing apparatus 10 is shared among a plurality of users.

In the second embodiment, as the notification process for prohibiting (or suppressing) touching the printing medium, the printing process of printing the identification information to prohibit (or suppress) the touching and the display process of making a display to prohibit (or suppress) the touching on the display portion 18 are executed. However, at least either one of the printing process and the display process may be executed as the notification process. In this case, the selection screen which allows selecting whether to make a notification to prohibit (or suppress) touching the printing medium may be a screen which allows selecting execution of either one or both of the printing process and the display process. In S508 or S510 of FIG. 8, the CPU 302 may execute both or either one of the printing process and the display process based on the information set in the selection screen. Incidentally, it is determined in advance which of the printing process and the display process is executed in a case where the execution of either one of the processes is selected. However, a further selection screen may be displayed to allow selecting at least one of the printing process and the display process to be executed. For example, if the display process is selected, after the execution of S508 of FIG. 5, the printing process of the adjustment pattern is performed in S510 without executing the process of printing on the printing medium an image or icon to prohibit (or suppress) touching the printing medium. If the printing process is selected, S510 is executed without executing S508.

Other Embodiments

The embodiments described above may be modified as shown in (1) to (5) below.

(1) In the above embodiments, a notification to prohibit (or suppress) touching a printing medium is made at the time of printing the adjustment pattern on a front side in the case of printing the adjustment pattern on both sides of a printing medium, but is not limited to this. Predetermined patterns for various adjustments may be printed. Alternatively, for example, in the case of printing an image desired by a user on both sides of a printing medium, a notification to prohibit (or suppress) touching the printing medium may be made at the time of printing the desired image on the front side. In this case, the notification to prohibit (or suppress) touching the printing medium is limited to a display of an animation, guidance, or character string on the display portion 18 and a prohibition (or suppression) image is not printed. This will be described below in detail with reference to FIG. 10.

Figure 10:
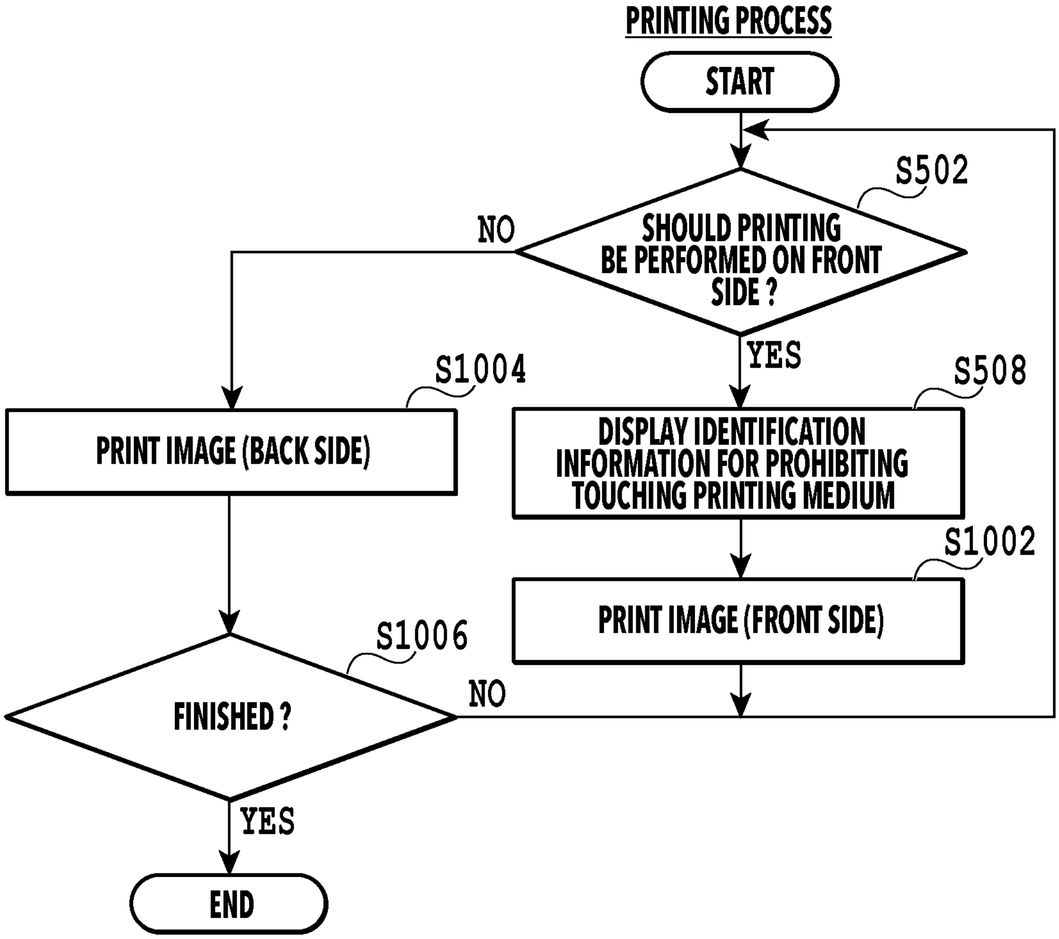
FIG. 10 is a flowchart showing the content of a printing process according to another embodiment.

FIG. 10 is a flowchart showing a detailed processing routine of a printing process in double-sided printing. The procedure shown in the flowchart of FIG. 10 is performed by the CPU 302 loading a program code stored in the ROM 304 into the RAM 306 and executing the program code. Alternatively, part or all of the functions of the steps in FIG. 10 may be executed by hardware such as an ASIC or electric circuit. Incidentally, in the flowchart of FIG. 10, a step of performing processing identical to that of FIG. 5 is denoted by the same step number and the detailed description of the processing is omitted.

If the printing process of FIG. 10 is started, it is first determined in S502 whether printing should be performed on the front side of the printing medium. If it is determined that printing should be performed on the front side of the printing medium, the display portion 18 makes a display to prohibit (or suppress) touching the printing medium in S508. After that, the CPU 302 prints a desired image on the front side of the printing medium based on print data generated by the generation portion 30 (S1002) and returns to S502. The print data used in S1002 is print data on an image to be printed on the front side of the printing medium generated by the generation portion 30.

If it is determined in S502 that printing should be performed not on the front side of the printing medium, the CPU 302 prints a desired image on the back side of the printing medium based on print data generated by the generation portion 30 (S1004). The print data used in S1004 is print data on an image to be printed on the back side of the printing medium generated by the generation portion 30. After that, the CPU 302 determines whether the printing has been finished (S1006). If it is determined that the printing has been finished, the printing process is finished. If it is determined in S1006 that the printing has not been finished, the process returns to S502.

As described above, in the printing process of FIG. 10, a display to prohibit (or suppress) touching a printing medium is made on the display portion 18 whenever printing is performed on a front side. This can prohibit (or suppress) a user from mistakenly removing a printing medium undergoing printing at the time of printing a desired image.

(2) In the above embodiments, the prohibition (or suppression) image is additionally printed on the front side of the printing medium to prohibit (or suppress) a user from touching the printing medium, but is not limited to this. The prohibition (or suppression) image may be additionally printed also on the back side of the printing medium. This can prohibit (or suppress) a user from removing the printing medium, for example, at the time of waiting after the printing of the adjustment pattern on the back side, thereby prohibiting (or suppressing) the occurrence of an error with more reliability.

(3) In the above embodiments, a notification to prohibit (or suppress) touching a printing medium is made by printing an illustration and character string and displaying an animation, guidance, or character string, but is not limited to this. That is, it is only necessary to execute at least one of printing of an illustration, printing of a character string, display of an animation, display of a guidance, and display of a character string. It is also possible to provide a guidance through a speaker to prohibit (or suppress) removal of a printing medium.

(4) In the above embodiments, in a case where the adjustment pattern has been printed on a back side without error, if a user chooses not to make a notification to prohibit (or suppress) touching a printing medium, a notification to prohibit (or suppress) touching a printing medium is not made, but is not limited to this. That is, in the case of printing the adjustment pattern on both sides of a printing medium, a notification to prohibit (or suppress) touching a printing medium may be executed whenever the adjustment pattern is printed on a front side.

(5) Although not particularly described in the above embodiments, in the case of not making a notification to prohibit (or suppress) touching a printing medium, a display to prohibit (or suppress) touching a printing medium may be made on the display portion 18 without printing a prohibition (or suppression) image that is an image to prohibit (or suppress) touching a printing medium. Further, although not particularly described in the above embodiments, the printing apparatus 10 to which the above embodiments are applicable may be a printing apparatus without the display portion 18. In this case, as a notification to prohibit (or suppress) touching a printing medium, an image to prohibit (or suppress) touching a printing medium is printed but a display to prohibit (or suppress) touching a printing medium is not made.

(6) The above embodiments and various forms stated in (1) to (5) may be combined as appropriate.

OTHER EMBODIMENTS

The above embodiments are also implementable by executing the process of supplying a system or apparatus with software (program) for implementing the functions of the above embodiments via a network or various storage media and reading and executing the program by a computer (such as a CPU or MPU) of the system or apparatus. The program may be executed by either a single computer or a plurality of computers in cooperation. Further, not all of the above processes should be necessarily implemented by software; part or all of the processes may be implemented by hardware such as an ASIC. Moreover, the CPU is not limited to a single CPU executing all the processes; a plurality of CPUs may execute the processes in cooperation as appropriate.

Furthermore, the functions of the above embodiments are executable not only by the computer executing the read program code. There is a case where the functions of the above embodiments are implemented by an OS or the like running on the computer executing part or all of the actual processes under instructions from the program code.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-028237, filed Feb. 25, 2022, and No. 2022-211293, filed Dec. 28, 2022, which are hereby incorporated by reference wherein in their entirety.

What is claimed is:

1. A printing apparatus comprising:

a printing unit configured to perform printing on a printing medium with a printing material;

a first printing control unit configured to control the printing unit to print, on a first side of the printing medium, an adjustment process pattern for an adjustment process for adjusting a position in which the printing material is printed;

a second printing control unit configured to control the printing unit to print the adjustment process pattern on a second side, which is a back side of the first side, after printing of the adjustment process pattern on the first side is completed; and a notification unit having a memory containing instructions and a processor for executing the instructions to execute a notification process for notifying both of information indicating that the adjustment process is executed and identification information for suppressing a user from removing the printing medium with the adjustment process pattern printed on the first side.

2. The printing apparatus according to claim 1, wherein the information on execution of the adjustment process is information indicating that the adjustment process pattern is printed.

3. The printing apparatus according to claim 2, wherein the information on execution of the adjustment process and the identification information are displayed on a display portion of the printing apparatus.

4. The printing apparatus according to claim 2, wherein the information on execution of the adjustment process and the identification information are printed on the printing medium by the printing unit.

5. The printing apparatus according to claim 2, wherein the information on execution of the adjustment process and the identification information are at least one of an animation, guidance, and message.

6. The printing apparatus according to claim 1, wherein the information on execution of the adjustment process is the adjustment process pattern.

7. The printing apparatus according to claim 6, wherein the identification information is printed by the printing unit in a case where the first printing control unit prints the adjustment process pattern on the first side of the printing medium.

8. The printing apparatus according to claim 6, wherein the identification information is printed in a visible position on the printing medium.

9. The printing apparatus according to claim 6, wherein the identification information is printed near a downstream end in a discharge direction in which the printing medium is discharged.

10. The printing apparatus according to claim 6, wherein the identification information is at least one of an illustration, image, and character string to suppress a user from removing the printing medium with the adjustment process pattern printed on the first side.

11. The printing apparatus according to claim 6, wherein the identification information is printed in a color that enhances user recognition.

12. The printing apparatus according to claim 1, wherein the notification process includes:

a display process for displaying information on the adjustment process and the identification information on a display portion of the printing apparatus; and a printing process for printing information on the adjustment process and the identification information on the printing medium by the printing unit.

13. The printing apparatus according to claim 12, further comprising a display unit configured to display, on the display portion, a selection screen to allow selecting which of the display process and the printing process is to be executed, wherein the display process is executed in a case where a selection is made to execute the display process in the selection screen, and the printing process is executed in a case where a selection is made to execute the printing process in the selection screen.

14. The printing apparatus according to claim 1, further comprising a display unit configured to display, on a display portion, a selection screen to allow selecting whether to execute the notification process, wherein the notification process is executed in a case where a selection is made to execute the notification process in the selection screen, and control is executed so as not to execute the notification process in a case where a selection is not made to execute the notification process in the selection screen.

15. The printing apparatus according to claim 1, wherein in a case where the printing medium has been removed during printing of the adjustment process pattern executed last time, the notification unit notifies at least identification information for suppressing a user from removing the printing medium with the adjustment process pattern printed on the first side, and in a case where the printing medium has not been removed during printing of the adjustment process pattern executed last time, the notification unit executes control so as not to notify at least identification information for suppressing a user from removing the printing medium with the adjustment process pattern printed on the first side.

16. The printing apparatus according to claim 1, wherein the adjustment process pattern printed on the first side is different from the adjustment process pattern printed on the second side.

17. The printing apparatus according to claim 1, wherein the adjustment process pattern is a registration adjustment pattern used in a registration adjustment process for adjusting registration.

18. The printing apparatus according to claim 17, wherein the registration adjustment process is executed on arrival of the printing apparatus.

19. The printing apparatus according to claim 17, wherein the registration adjustment process is executed in a case where a print head is replaced in the printing apparatus.

20. The printing apparatus according to claim 1, wherein the printing medium is paper.

21. The printing apparatus according to claim 1, wherein the printing material is ink.

22. A method of controlling a printing apparatus and performing printing on a printing medium with a printing material, the method comprising:

a first printing step of printing, on a first side of the printing medium, an adjustment process pattern for an adjustment process for adjusting a position in which the printing material is printed;

a second printing step of printing the adjustment process pattern on a second side, which is a back side of the first side, after printing of the adjustment process pattern on the first side is completed; and a notification step of executing a notification process for notifying both of information indicating that the adjustment process is executed and identification information for suppressing a user from removing the printing medium with the adjustment process pattern printed on the first side.

* * * * *